(12) United States Patent
Hunter et al.

(10) Patent No.: US 6,862,739 B1
(45) Date of Patent: Mar. 1, 2005

(54) SCALABLE AND PORTABLE DISC PLAYER FOR VARIOUS OPTICAL DISC SIZES

(75) Inventors: Charles L. Hunter, Loveland, CO (US); Lawrence N. Taugher, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 644 days.

(21) Appl. No.: 09/698,862

(22) Filed: Oct. 27, 2000

(51) Int. Cl.$^7$ .............................................. G11B 17/04
(52) U.S. Cl. ...................................................... 720/653
(58) Field of Search ................................. 720/653, 652, 720/654, 655, 657; 369/75.11, 289.1, 291.1, 75.2, 77.1, 289, 291, 75.1

(56) References Cited

U.S. PATENT DOCUMENTS

| | | | | |
|---|---|---|---|---|
| 4,403,317 A | | 9/1983 | Suzuki et al. | |
| 5,265,083 A | * | 11/1993 | Ishii et al. | 369/75.2 |
| 5,870,367 A | * | 2/1999 | Yamamori | 369/75.1 |
| 6,134,206 A | | 10/2000 | Furukawa et al. | |
| 6,137,759 A | * | 10/2000 | Ogiro et al. | 369/75.2 |
| 6,169,720 B1 | * | 1/2001 | Kamemura et al. | 369/75.2 |
| 6,229,779 B1 | * | 5/2001 | Berry et al. | 369/75.1 |
| 6,385,154 B1 | * | 5/2002 | Kokubo et al. | 369/75.1 |
| 6,477,128 B1 | * | 11/2002 | Ma | 369/77.1 |

FOREIGN PATENT DOCUMENTS

| | | | |
|---|---|---|---|
| JP | 2000 187973 | * | 7/2000 |
| JP | 2000 195246 | * | 7/2000 |

* cited by examiner

Primary Examiner—Angel Castro

(57) ABSTRACT

A scalable and portable disc player or recorder for containing and transferring audio, video or computer data to and from an optical disc of various sizes. The casing of the disc player provides a case scaling mechanism having a set of pivotal wings and slidable sleeves that can be adjusted to accommodate various optical disc sizes. This same process changes the structural size of the disc player casing.

12 Claims, 8 Drawing Sheets

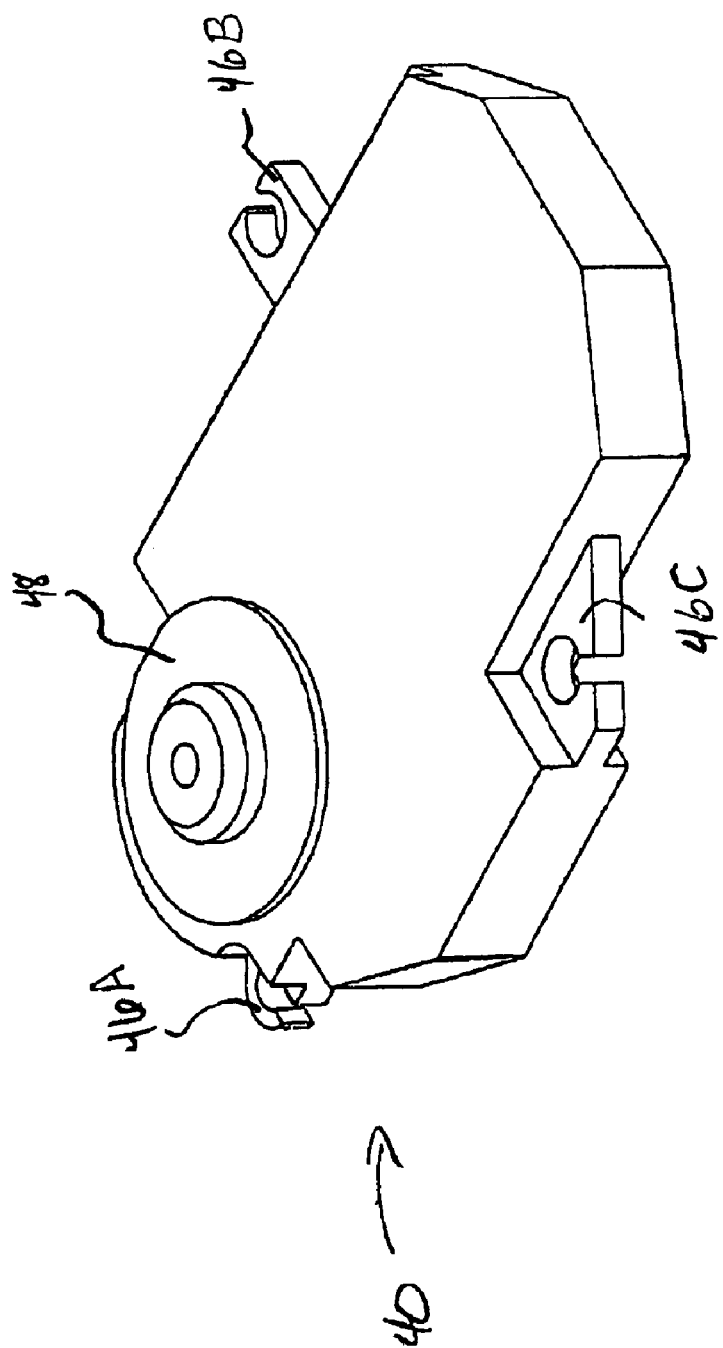

SCALABLE AND PORTABLE DISC PLAYER FOR VARIOUS OPTICAL DISC SIZES

BACKGROUND OF THE INVENTION

1. Field of the Invention

This invention relates generally to an optical disc player and more specifically to a portable disc player/recorder that provides a scalable casing for containing various disc sizes.

2. Background of the Invention

Today, most electronic data, whether it is audio, video or computer, is stored and transferred via an optical disc, such as a compact disc ("CD") or a Digital Versatile Disc ("DVD"). With this growing use of the optical disc, many portable disc players for reading these discs have been developed.

In general, a portable disc player or recorder may be a peripheral component of a laptop computer or a stand alone portable device that can be carried in the palm of a user's hand. With either type, the player will provide a casing for containing a data transfer device ("DTD") having various conventional mechanisms that allow the player to read and/or write data to and/or from the disc. At a minimum, the DTD will include a conventional optical pickup unit ("OPU") having a sled motor, a spindle motor, and an actuator or voice coil; and general electronics for encoding, decoding and transferring the signal obtained from the optical disc by the OPU to at least one input/output ("I/O") port. The I/O ports are also conventional and may be used to couple the signal to anything from a processor to a set of headphones. In some instances, the DTD may also include a processor for translating the audio, video or computer signal.

The casing of each optical disc player will also include a mechanism for inserting the optical disc. One of the most common mechanisms of a laptop for handling the insertion and removal of a CD and/or DVD utilizes a tray. The tray is typically activated by the user and requires the operation of various mechanical parts. Another mechanism allows the user to position the CD and/or DVD into a slot in the front of the drive. With either of these mechanisms, the positioned disc must be picked up at some point in the insertion process and positioned on a motor spindle of the OPU for subsequent reading and writing operations. When ejection of the CD is desired, the same mechanism removes the CD from the motor spindle and ejects it to some position that resides partially outside of the drive so that the operator can grasp the disc.

Although some portable hand-held disc players may use the above mechanism to insert and remove a disc, most stand alone disc players utilize the casing. More specifically, the casing in most stand alone disc players, such as a CD player, provides a top portion that is hinged to the bottom portion. Therefore, by using a common latch system, the top portion of the casing can be secured to the bottom portion to contain a disc, and opened to remove or insert a disc. As with the laptop mechanisms, the disc would be secured to the motor spindle of the OPU during the insertion process.

Other elements that are typically associated with a portable disc player include a power source or plug, LEDs for displaying operational conditions, at least one operational button and a central processing unit. Obviously, the stand alone disc player may have numerous buttons to accommodate the various operations of the player and may provide a LCD for displaying the progress of the player while operating. Some of the buttons could be used for operations selected from the group including play, stop, skip, volume, forward, rewind, and pause. General directional arrows may also be employed for menu options provided by a processing unit.

When the above portable disc players are designed to accommodate both 80 and 120 mm discs, the size of the casing is always larger then a 120 mm disc. Consequently, when an 80 mm disc is positioned within a disc player that can accommodate both 80 and 120 mm discs, the size of the disc player will not change. Since a 120 mm CD or DVD provides nearly twice the surface area as a 80 mm CD, a player that only accommodates an 80 mm disc will have a much smaller casing and therefore will be much easier to carry and stow. However, such a device can only be used for a 80 mm disc.

Although most audio, video and computer data is sold today on a 120 mm disc, the future of optical disc technology is moving toward the much smaller 80 mm disc. Therefore, it would be desirable to have a single portable disc player that could be structurally scaled to accommodate a representative size of the disc it accepts. The present invention is directed to overcoming the above problems associated with conventional disc drives.

SUMMARY OF THE INVENTION

In general, the present invention provides a disc player, with optional recording capabilities, that can accommodate various optical disc sizes. The case for the disc player includes a top and bottom shell and a scalable mechanism. The shells pivotally couple together and interact to form a cavity for containing the disc. The scalable mechanism provides a set of wings and sleeves that pivot and slide, respectively, while being coupled to the top and bottom shells, to change the structural size of the disc player. The disc player casing also includes an data transfer device ("DTD") that attaches to the bottom shell for transferring data from the disc to a desired I/O port.

In one embodiment, the present invention provides a portable disc player casing that includes a top and bottom shell movably attached to allow the insertion and removal of the disc within a cavity of the casing; an data transfer device ("DTD") attached to the bottom shell for obtaining and transferring data; and a mechanism for accommodating the size of the disc and changing the structural size of the player.

In still another embodiment, a process is provided for reading/writing data to/from an optical disc. The process includes the steps of: opening a disc player casing to expose a cavity and a data transfer device ("DTD"); adjusting the size of the casing to accommodate the size of the disc; securing the disc to the DTD; closing the casing to contain the disc within the cavity; and implementing the DTD to transfer data from the disc to an I/O port, via the DTD.

BRIEF DESCRIPTION OF THE DRAWINGS

Other aspects and advantages of the invention will become apparent upon reading the following detailed description and upon reference to the drawings, in which:

FIG. 8 illustrates an isometric view of the optical pickup unit of FIGS. 1–4.

Figure 1:
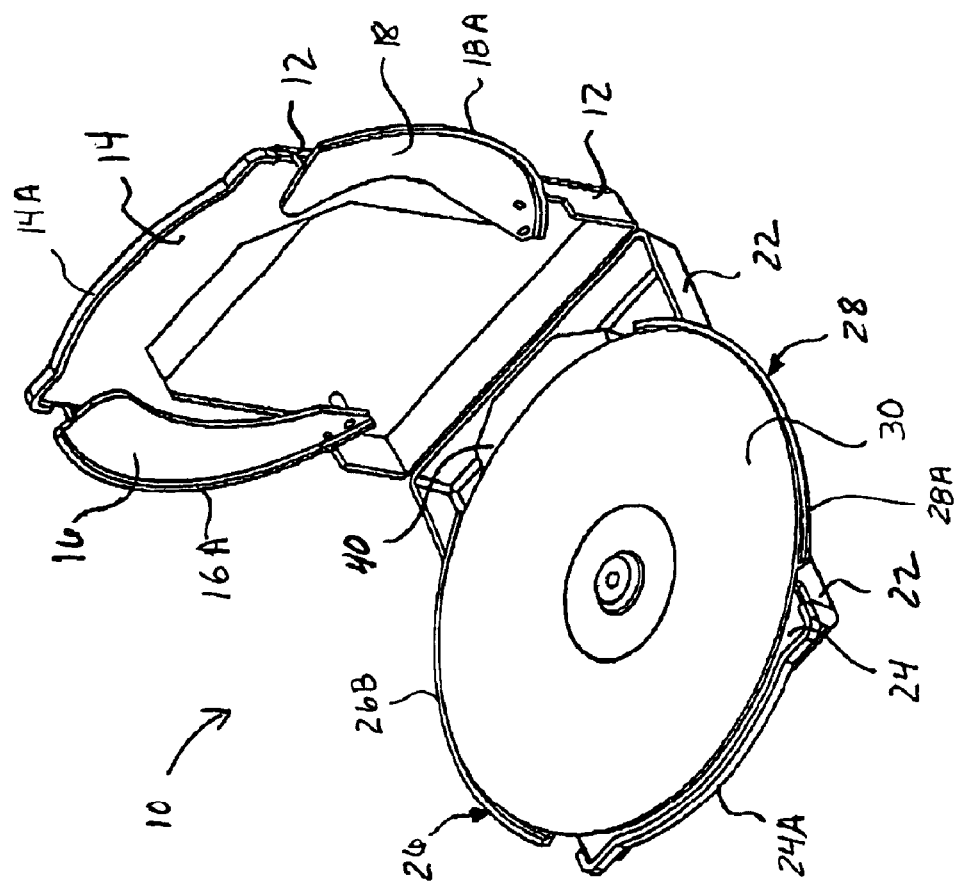
FIG. 1 illustrates an isometric view of an optical disc player while containing a 120 mm disc in accordance with the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
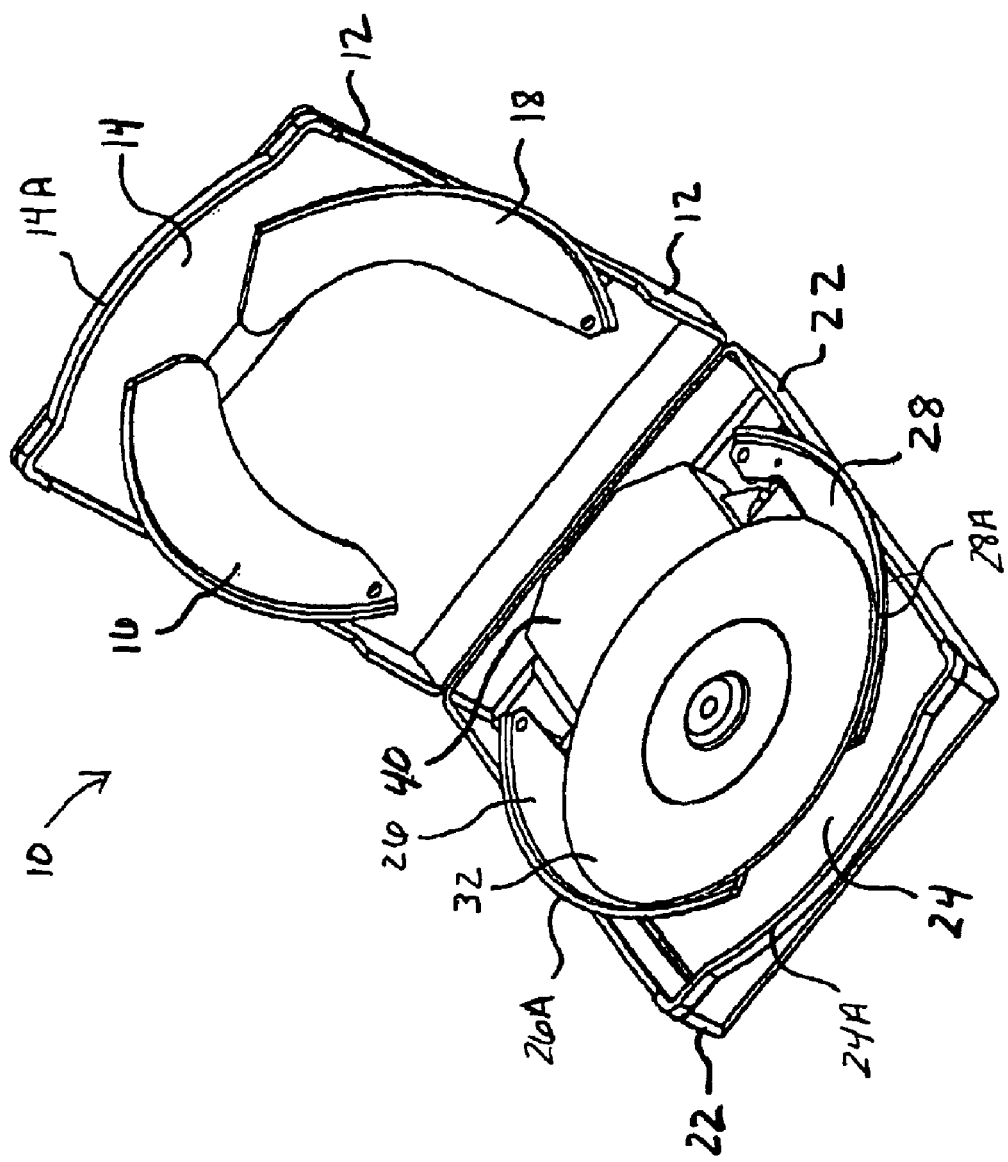
FIG. 2 illustrates an isometric view of the disc player of FIG. 1 while containing a 80 mm CD.

Turning now to the drawings, FIGS. 1 and 2 illustrate the inventive optical disc player 10 in an open position providing a first and second structural configuration for containing a 120 mm CD or DVD 30 and a 80 mm CD 32, respectively. The disc player 10 includes a top and bottom shell or cover 12 and 22, a top and bottom sleeve or tray 14 and 24, a top and bottom set or pair of wings 16, 18 and 26, 28, and a data transfer device ("DTD") 40. As will be discussed in more detail, the top and bottom set of wings 16, 18 and 26, 28 include a respective flange 16A, 18A and 26A and 28A, and the top and bottom sleeves 14 and 24 provide a respective flange 14A and 24A. The DTD 40 connects to the bottom shell 22 to receive the CD or DVD within the casing of the disc player 10 and provides conventional mechanisms as described in the background of the invention for obtaining and/or providing data to and/or from a CD or DVD being contained by the disc player while operating.

In a preferred embodiment, the DTD 40 can be connected to a compatible processing unit (not shown) by a known data cable and conventional I/O ports. The I/O port(s) (not shown) would be coupled between the DTD 40 and an exterior surface of the disc player 10. As an example, the data cable for connecting the DTD 40 to a processing unit may be selected from the group including serial, parallel, USB and the like. In addition, the top shell 14 would include a conventional LCD display and operational buttons (neither shown) for controlling the operation of the disc player. The operational buttons could be used for operations selected from the group including play, stop, skip, volume, forward, rewind, and pause. General directional arrows may also be employed for menu options. In an alternative embodiment, the skilled artisan should appreciate that the processing unit could be incorporated as a part of the DTD 40 to assist with operational functions of the disc player and associated buttons and LCD.

Figure 3:
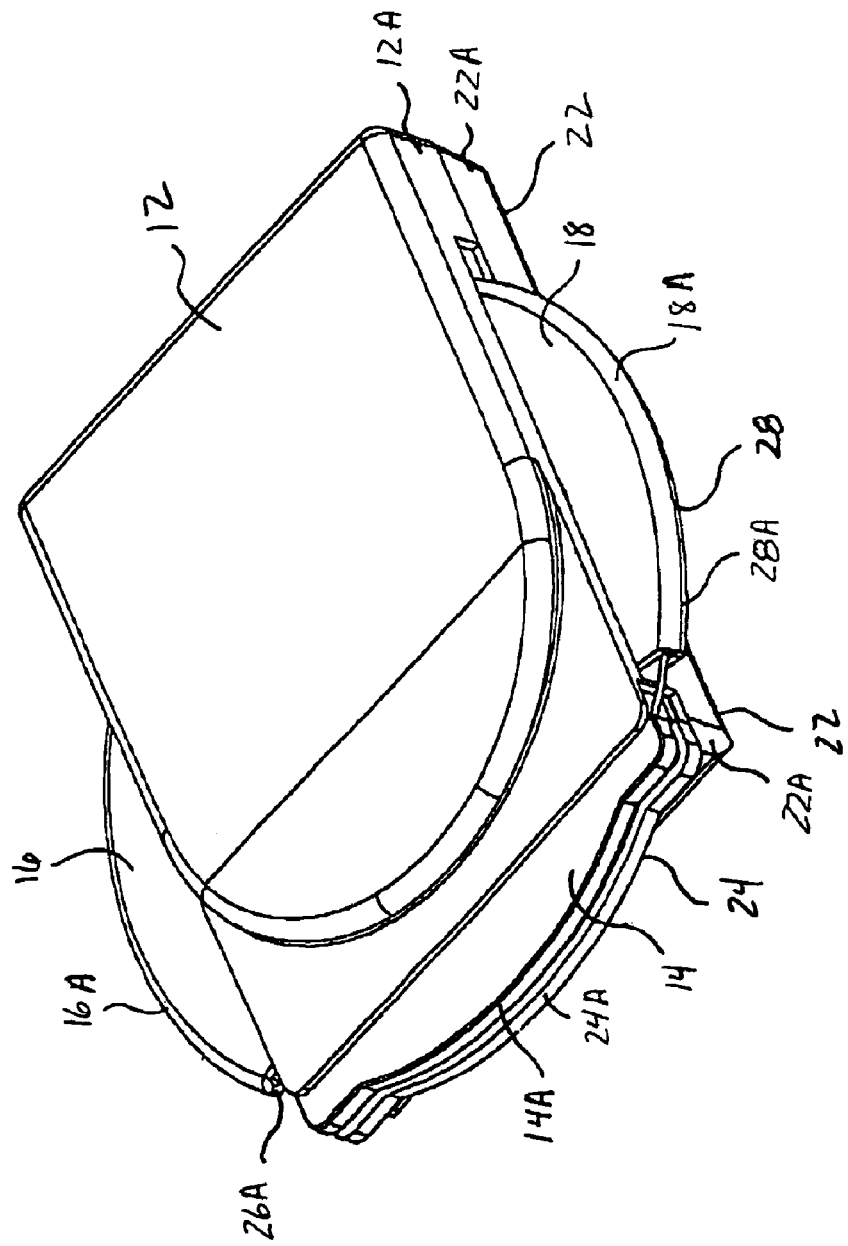
FIG. 3 illustrates the disc player of FIG. 1 while containing a 120 mm disc.
Figure 4:
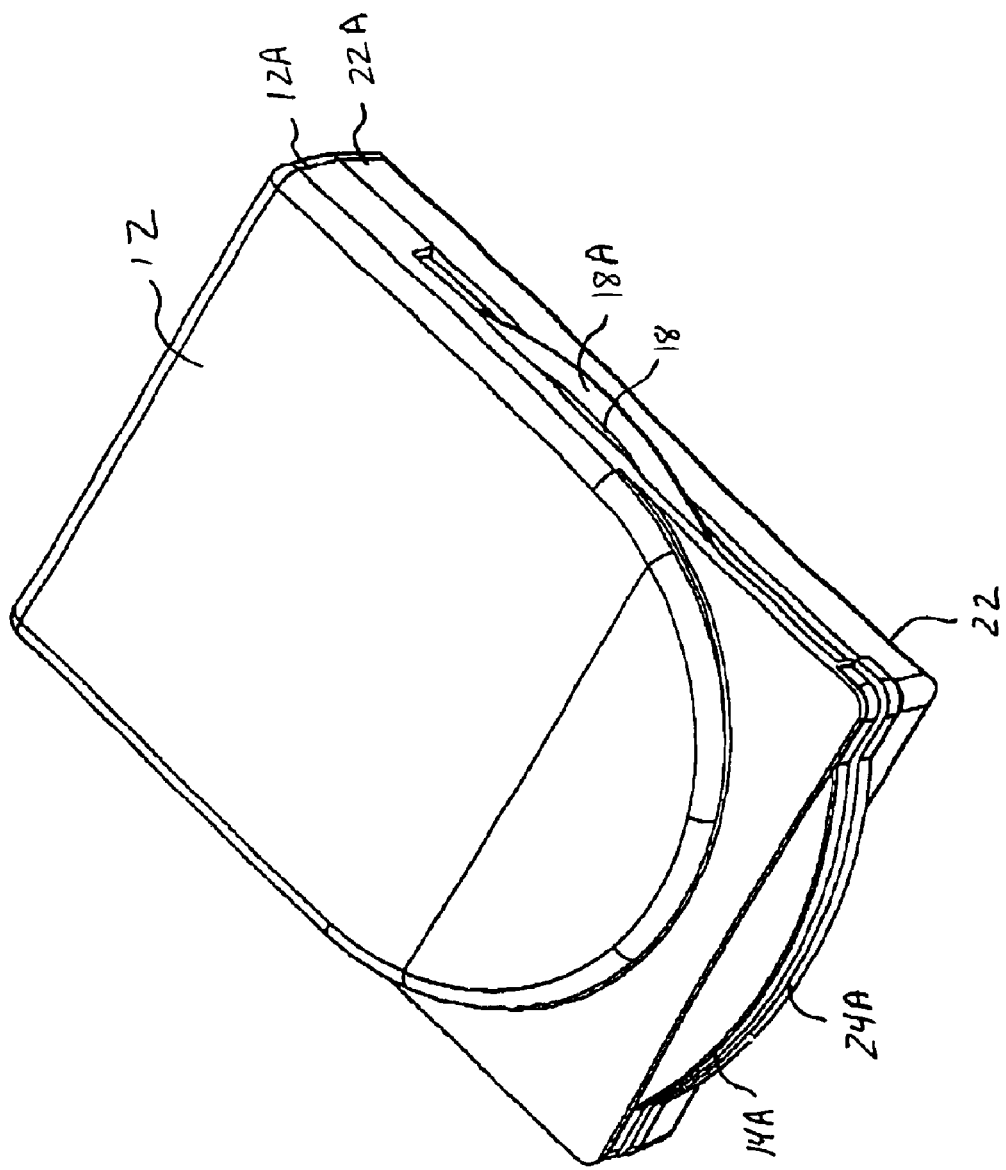
FIG. 4 illustrates the disc player of FIG. 2 while containing a 80 mm CD.

FIGS. 3 and 4 illustrate the same disc player 10 of FIGS. 1 and 2 having the first and second structural position. However, with these illustrations the top shell 12 is in a fully closed position to secure the disc within the casing cavity. In addition, FIGS. 3 and 4 show the sleeves 14, 24 and wings 16, 18, 26, 28 in a fully expanded position to contain the 120 mm disc and in a fully contracted position to contain the 80 mm optical disc, respectively. In the closed position, flanges 16A and 18A of the top set of wings 16 and 18 interact with flanges 26A and 28A of the bottom set of wings 26 and 28 to enclose and protect the optical disc adjacent a right and left side of the disc player 10. In addition, flanges 14A and 24A of the top and bottom sleeves 14 and 24 interact with one another to enclose and protect the CD and DVD adjacent a front portion of the disc player 10. In particular, the sleeves 14 and 24 and wings 16, 18 and 26, 28 expand to closely surround and protect the 120 mm CD or DVD of FIG. 1, and the sleeves 14, 24 and wings 16,18 and 26, 28 contract to closely surround and protect the 80 mm CD of FIG. 2.

Figure 5:
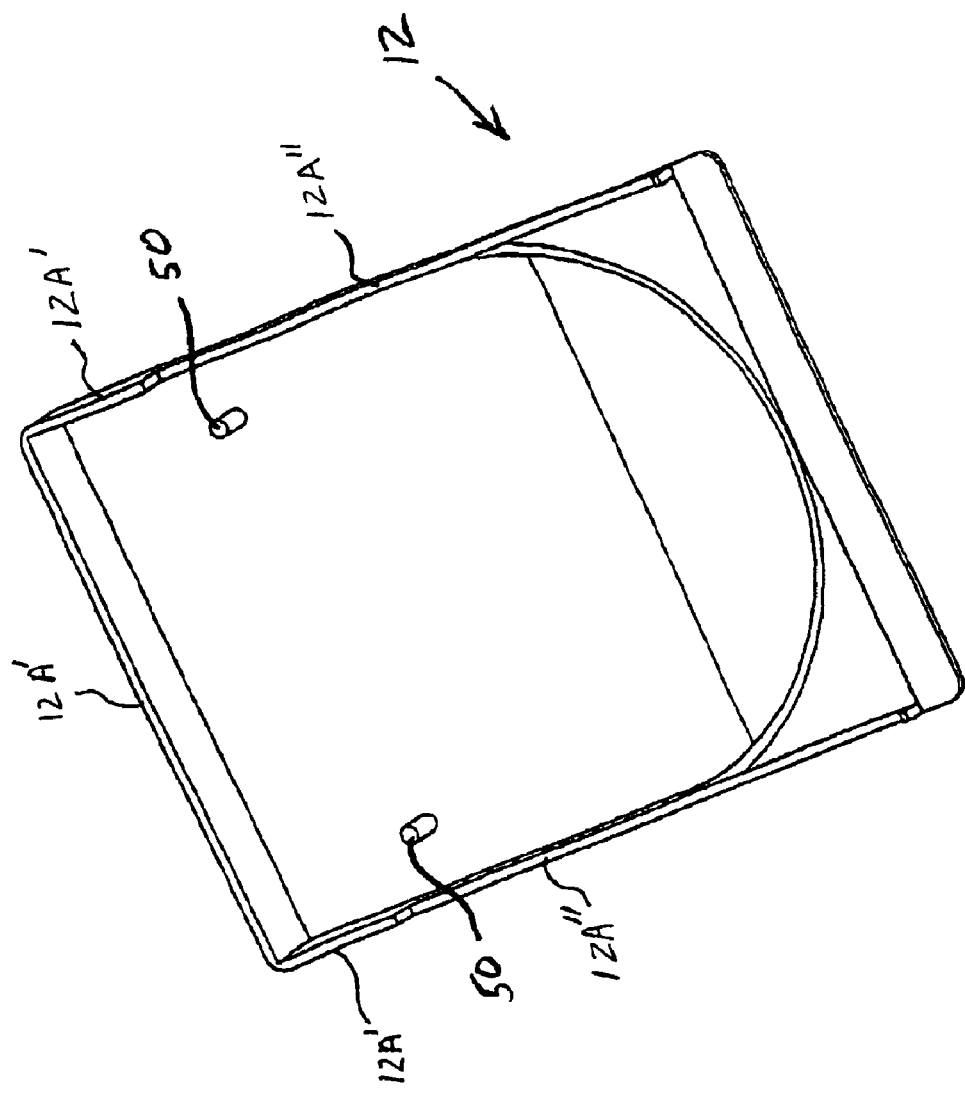
FIG. 5 illustrates an isometric view of the top shell of FIGS. 1–4.
Figure 6:
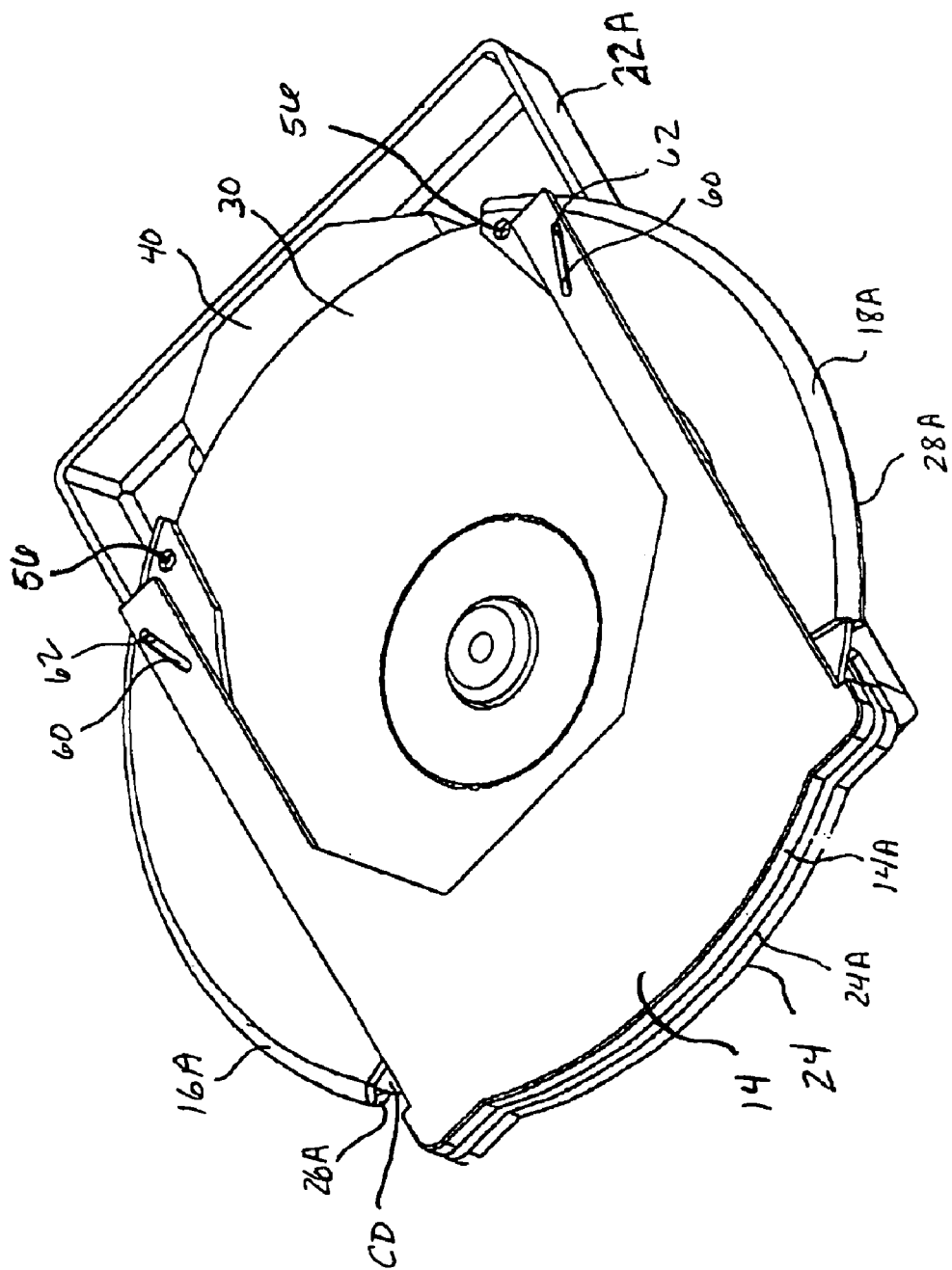
FIG. 6 illustrates the disc player of FIG. 3 with the top shell removed.
Figure 7:
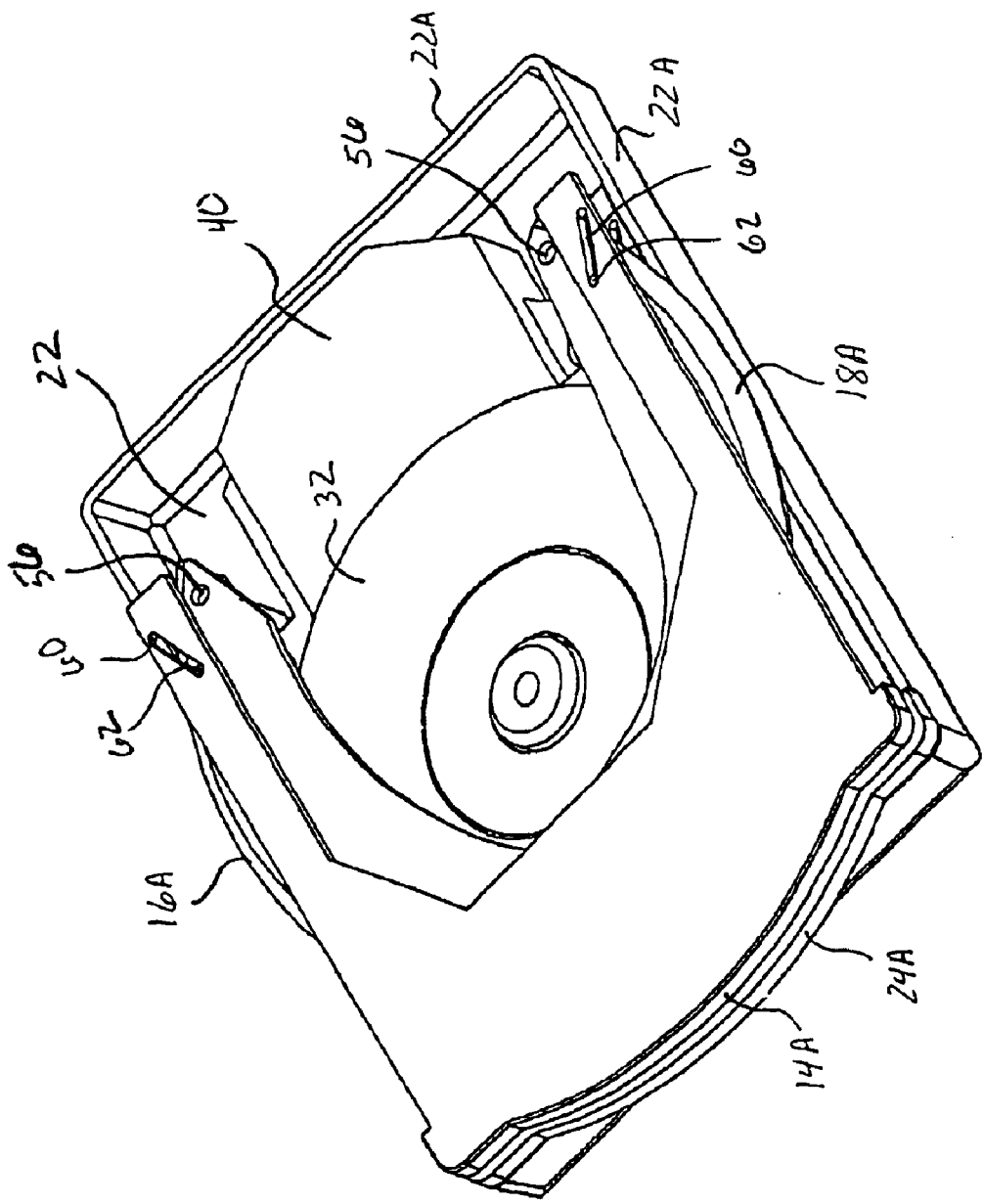
FIG. 7 illustrates the disc player of FIG. 4 with the top shell removed.

Now that the basic components of the inventive disc player have been described, FIGS. 5–8 will layout the functional elements of each component and how they operate together to receive and contain a CD or DVD for data transfer operations. In particular, FIG. 5 illustrates the top shell 12 of the disc player 10 after being removed from the disc player of FIGS. 1–4. FIGS. 6 and 7 illustrate the disc player 10 without the top shell 12 of FIG. 5, and FIG. 8 illustrates a conventional DTD 40 as shown in FIGS. 1–2 and 6–7.

Before the detailed description for each element of the shell is disclosed, it should be noted that the top sleeve 14 and set of wings 16 and 18 provide a mirror image of the bottom sleeve 24 and set of wings 26 and 28 for all functional aspects and structure. Similarly, the top shell 12 provides the same functional aspects as the bottom shell 22 for the purposes of the present invention. Therefore, any element of the top shell that would not be mirrored on the bottom shell, such as additional mounting post for the DTD 40 on the bottom shell, a conventional LCD, operational buttons and accommodating circuitry for the top shell, and conventional latch system components attached to the top and bottom shell, would be contemplated by the present invention to other known concepts associated with disc player.

Turning to FIG. 5, the top shell 12 includes two mounting posts 50 and a wall 12A. The two mounting posts 50 reside near a back region of the disc player 10 to receive complementing holes 56 of each set of wing 16, 18 and 26, 28 (see FIGS. 6 and 7). In a preferred embodiment, each hole 56 of a wing surrounds a top portion of a respective post 50 when attached. With this arrangement, the top portion of the post would provide a smaller diameter then the lower portion of the post 56 closest to the surface of the top shell. Therefore, the hole of each wing would rest on a ledge of the respective post while attached. If desired, a securing element (not shown), such as a screw, could also be positioned through the hole 56 and screwed into a reciprocating hole of the post to attach each wing 16, 18, 26, and 28 to each respective mounting post 50.

The wall 12A for the top shell 12 can be divided into three sections: a back section 12A' and two side sections 12A". As illustrated, the back section 12A' extends the entire length of a back region and along a portion of a side region of the disc player 10. Each side section 12A" extends from the back section 12A', adjacent the side region, to a predefined region near the front side of the disc player as illustrated. The distance of the side sections 12" will allow any portion of a CD being contained by the disc player 10 to extend out of the shell for the wings and sleeve to protect. In general, the difference in height between the wall sections 12' and 12A" will be greater then the thickness of the CD or DVD and the wings.

As noted above, the bottom shell 22 is very similar to the top shell 12. In particular, the bottom shell 12 provides two mounting posts (not shown) adjacent a back region of the shell 10 that complements the posts 50 of the top shell 12. However, the wall 22A for the bottom shell 22 provides only one height that surrounds the entire parameter of the surface, and the height for the bottom shell wall is greater then the height of the DTD 40 as illustrated in FIG. 8.

Before the top or bottom wings 16, 18 and 26, 28 can be attached to their respective mounting posts 50, the DTD 40 of FIG. 8 should be attached to the bottom shell 22 of the disc player 10 as illustrated in FIGS. 1 and 2. The DTD 40 can be secured to the bottom shell 22 by a Conventional means such as screws, glue or rivets using the securing arms 46A, 46B and 46C illustrated in FIG. 8. The DTD 40 also secures a disc 30, 32 within the disc player 10 by a conventional securing platter 48. Besides the securing platter 48, the DTD 40 also includes the various conventional mechanisms (not shown) selected from the group including an optical pickup unit ("OPU") having a motor spindle, a sled motor, an actuator or voice coil, and a power source; and general electronics for encoding, decoding, and transferring the signal obtained from the optical disc to an input/output ("I/O") port, via the OPU. The I/O ports may be connected to a processor and will typically be specifically designed for the type of electronic data that the player will read or write, whether it is audio, video or computer. Therefore, the inventive disc player may also provide the associated I/O ports to accommodate the transfer of audio, video and computer data to the appropriate device for using the same. In addition, the power source could be a conventional battery pack structure integrated within the bottom shell of the disc player, a power cord, or both, using a conventional technique.

Other elements that are typically associated with a portable disc player, but are not shown, include LEDs or a LCD for displaying operational conditions, at least one operational button, a speaker, and possibly a processing unit. In a preferred embodiment, the disc player of the present invention would include numerous buttons to accommodate the various operations of the disc player and a LCD for displaying the progress of the player while operating. The LCD and operational buttons could be conventionally mounted on a front region of the disc player 10. The buttons would be used for operations selected from the group including play, stop, skip, volume, forward, rewind, pause, and general directional arrows for menu options provided a processing unit, if used.

Once the DTD 40 is secured in place, the top and bottom sleeves 14 and 24 should be positioned between the respective shell 12 and 14 and set of wings 16, 18 and 26, 28. Looking again at FIGS. 5 and 6, the top sleeve 14 clearly shows a groove 60 adjacent each back corner region of the disc player 10 for receiving a complementing pin 62 on each wing 16, 18 and 26 and 28. With the pin 62 positioned within the complementing groove 60 of a wing, the wing can be pivotally attached to the shell by the mounting posts 50 as described above. Once each set of wings is attached to their respective posts 50, a user can pull and push on the top and bottom sleeve 14, 24 to create an area large enough for receiving and containing a CD or DVD having a diameter of various sizes.

In other words, the inventive disc player 10 can provide a first dimensional size when carrying a 120 mm optical disc as illustrated in FIGS. 1, 3 and 5 and a second dimensional size when carrying a 80 mm optical disc as illustrated in FIGS. 2, 4 and 6. In particular, the disc player 10 provides a structural size that is slightly bigger than the dimensions of the CD or DVD it contains. Therefore, the inventive disc player can be scaled to be smaller then conventional disc players for carrying an 80 mm CD. A skilled artisan should appreciate that the inventive disc player is not limited to the dimensions of a 80 mm and 120 mm optical disc, and therefore could be modified to accommodate optical discs that may be smaller, larger and thicker then a conventional CD or DVD.

In a preferred embodiment, the top shell 12 is at least partially transparent or translucent so that the user can read labels or other identification on a contained CD or DVD. In addition, the shells 12 and 22, the sleeves 14 and 24, and the set of wings 16, 18 and 26, 28 are preferably made from a material such as plastic. A conventional hinge system couples the top shell to the bottom shell using the back wall sections of disc player. In addition, a common latch system is also used to allow the front region of the top shell to secure to the front region of the bottom shell. Therefore, a top shell can be opened to remove or insert a disc (see FIGS. 1 and 2) and closed to secure an optical disc within the disc player (see FIGS. 3 and 4).

Now that the structural components of the present invention have been described and their function, the process for using the sane will follow. Generally, the process includes the steps of: opening a disc player to expose a cavity and an optical pickup mechanism ("DTD"); adjusting the size of the disc player for securing an optical disc to the DTD; closing the disc player to contain the disc within the cavity; and implementing the DTD to transfer data from the disc to an output terminal. As mentioned above, the I/O port could be used to couple speaks to the disc player to hear audio data, or to couple a video display to the disc player to view video data, or to couple a personal computer to the disc player to view video and computer data or listen to audio data contained on a disc.

With the inventive disc player, the process step for adjusting the disc player size involves a user slidably moving a sleeve 14, 18 or pivotally moving one or both of the wings on the top and bottom shell of the disc player until the size of the optical disc to be inserted into the disc player will fit into the cavity of the disc player and the protective area created by the wings and sleeves. Consequently, while the inventive disc player is adjusted to accommodate a 120 mm or a 80 mm CD, the overall size is scaled as well.

In summary, the present invention provides a protective disc player for an optical disc. The disc player is scalable to accommodate 120 mm CDs and DVDs or 80 mm CDs. When used for a 80 mm CD, the size of the disc player is small enough to be placed in a typical shirt pocket. A disc may remain in the disc player during transport, and for operational purposes, the disc player can be coupled to a computer, speakers, and a video screen, such as a TV or CRT, when desired. Preferably, the disc player is at least partially transparent or translucent, so that labels or other identification on a data storage medium can be read when a data storage medium is present in the disc player.

What is claimed:

1. A scalable optical disc player comprising:
   a top and bottom cover, each cover having a pair of mounting posts adjacent a back side of the player;
   a top and bottom set of wings, each wing pivotally couples to the respective mounting post and including a guide pin, wherein said top and bottom set of wings expand away from respective sides of the player and contract towards respective sides of the player; and
   a top and bottom sleeve movably coupled between the respective cover and pair of wings, each sleeve includes a pair of guide slots being positioned to receive each respective guide pin of each wing, wherein the top and bottom sleeves expand a front side of the player away from the back side and contract the front side towards the back side.

2. The disc player of claim 1, further including a data transfer device ("DTD") attached to a surface of the bottom cover.

3. The disc player of claim 2, further including data connectors coupled between an exterior surface of the bottom cover and the DTD for transferring data from the disc to the connectors, via the DTD.

4. The disc player of claim 3, wherein the DTD can read and/or write data to/from the disc.

5. The disc player of claim 1, wherein the top and bottom sleeves and set of wings can expand or contract to accommodate optical discs of varying sizes.

6. The disc player of claim 5, wherein the expansion and contraction of the sleeves and set of wings increases or decreases the overall size of the disc player.

7. The disc player of claim 1, wherein each wing of the top and bottom set of wings further include a flange adjacent either the left or right side of the disc player to protect the disc being contained within the disc player.

8. The disc player of claim 1, wherein each sleeve of the top and bottom sleeves further include a flange adjacent the front side of the disc player to protect the disc being contained within the disc player.

9. The disc player of claim 1, wherein the top and bottom covers hingably couple to provide the disc player with an open and closed position for inserting, containing and removing the disc.

10. The disc player of claim 1, wherein a portion of the top cover is translucent or transparent to allow any indicia on the disc to be visible while being contained by the disc player.

11. The disc player of claim 1, wherein the top cover further include a first wall of a first height adjacent the back side of the disc player, and a second wall of a second height adjacent a side portion of the disc player, the first height being greater then the second height.

12. A portable disc player having a casing for containing various disc sizes, the casing comprising:
   a top and bottom shell movably attached to allow the insertion and removal of the disc within a cavity of the casing, wherein the top and a bottom shell further include a first wall having a first height that extends along a portion of the shell perimeter, wherein the top shell further includes a second wall having a second height along a portion of the sides of the disc player;
   a data transfer device ("DTD") attached to the bottom shell for transferring data; and
   a mechanism for scaling the overall size of the player to accommodate disc size, wherein the top and the bottom shell further includes two mounting posts adjacent a back side, and the mechanism further includes:
      a top and bottom sleeve movably coupled to an interior surface of the top and bottom shell, respectively, each sleeve having two guide slots and a flange along a front side of the casing;
      a top and bottom pair of wings, each wing providing a guide pin and a flange along either the left or right side of the casing,
   wherein the shells hingeably couple together, each wing pivotally attaches to the respective cover and movably couples to the respective shell by the guide slot to accommodate the varying size discs being coupled to the DTD.

* * * * *